US006561208B1

(12) United States Patent
O'Connor et al.

(10) Patent No.: US 6,561,208 B1
(45) Date of Patent: May 13, 2003

(54) FLUIDIC IMPEDANCES IN MICROFLUIDIC SYSTEM

(75) Inventors: Stephen D. O'Connor, Pasadena; Eugene Dantsker, Torrance; Marci Pezzuto, Pasadena, all of CA (US)

(73) Assignee: Nanostream, Inc., Pasadena, CA (US)

( * ) Notice: Subject to any disclaimer, the term of this patent is extended or adjusted under 35 U.S.C. 154(b) by 0 days.

(21) Appl. No.: 09/550,184

(22) Filed: Apr. 14, 2000

(51) Int. Cl.[7] .................................................. F15C 1/00
(52) U.S. Cl. ...................... 137/15.18; 137/833; 251/368
(58) Field of Search ............................... 137/833, 15.18; 251/368

(56) References Cited

U.S. PATENT DOCUMENTS

| | | | |
|---|---|---|---|
| 4,426,451 A | 1/1984 | Columbus | 436/518 |
| 4,946,795 A | 8/1990 | Gibbons et al. | 436/179 |
| 5,194,133 A | 3/1993 | Clark et al. | 204/299 R |
| 5,376,252 A | 12/1994 | Ekström et al. | 204/299 R |
| 5,385,709 A | 1/1995 | Wise et al. | 422/98 |
| 5,443,890 A | 8/1995 | Öhman | 428/167 |
| 5,545,367 A | 8/1996 | Bae et al. | 264/401 |
| 5,595,712 A | 1/1997 | Harbster et al. | 422/129 |
| 5,640,995 A | 6/1997 | Packard et al. | 137/597 |
| 5,658,515 A | 8/1997 | Lee et al. | 264/219 |
| 5,690,763 A | 11/1997 | Ashmead et al. | 156/60 |
| 5,730,187 A | * 3/1998 | Howitz et al. | 137/803 |
| 5,755,026 A | * 5/1998 | Stephan et al. | 29/846 |

(List continued on next page.)

FOREIGN PATENT DOCUMENTS

| | | | | |
|---|---|---|---|---|
| WO | WO 01/04909 A1 | 1/1901 | | G25B/9/00 |
| WO | WO 98/45693 | 10/1998 | | |
| WO | WO 98/55852 | 12/1998 | | G01N/27/26 |
| WO | WO 99/19717 | 4/1999 | | |
| WO | WO 99/60397 | 4/1999 | | G01N/33/483 |
| WO | WO 99/29497 | 6/1999 | | |
| WO | WO 00/21659 | 4/2000 | | B01J/19/00 |
| WO | WO 00/22436 | 4/2000 | | G01N/33/567 |

OTHER PUBLICATIONS

Yang, Xing,, et al., "A MEMS Thermopneumatic Silicone Membrane Valve" (1998) *Sensors and Actuators A: Physical*, vol. 64, pp. 101–108.

Schulte, Thomas, "The Development of Practical Microfluidic–Based Systems for Chemical and Blood Analysis" (1999)*in Drug Discovery Technology for the New Millennium* Chapter 13, pp. 127–135. Conference proceeding: IBC USA Conferences, Inc.: 4th Annual Conference on Microfabrication and Microfluidic Technologies.

Becker, Holger, et al., "Silicon as Tool Material for Polymer Hot Embossing",(1999)*Proceedings MEMS '99 Orlando*, 228–231.

Jeon, Noo Li, et al., "Large–Area Patterning by Vacuum–Assisted Micromolding" (1999) *Adv. Mater. 11*, 11:946–950.

Jackman, Rebecca J., et al., "Electrochemistry and soft lithograph: A route to 3–D microstructures", (May 1999) *Chemtech* 18–30.

(List continued on next page.)

*Primary Examiner*—A. Michael Chambers
(74) *Attorney, Agent, or Firm*—Vincent K. Gustafson; Michael F. Labbee

(57) ABSTRACT

The invention provides microfluidic devices with embedded fluidic impedances. Such impedances do not allow fluid to pass at a low differential pressure, but allow fluid to flow at a higher differential pressure. Impedances are formed by the three dimensional overlap of two or more channels contained within layers of the device. Such devices can be rapidly protyped and can be assembled to contain multiple fluidic impedances to perform complex fluid handling tasks, including metering defined volumes of samples and dividing samples into aliquots.

41 Claims, 9 Drawing Sheets

U.S. PATENT DOCUMENTS

| | | | |
|---|---|---|---|
| 5,770,029 A | 6/1998 | Nelson et al. | 204/604 |
| 5,846,396 A | 12/1998 | Zanzucchi et al. | 204/601 |
| 5,849,208 A | 12/1998 | Hayes et al. | 216/94 |
| 5,858,188 A | 1/1999 | Soane et al. | 204/454 |
| 5,858,193 A | 1/1999 | Zanzucchi et al. | 204/601 |
| 5,882,465 A | 3/1999 | McReynolds | 156/285 |
| 5,882,571 A | 3/1999 | Kaltenbach et al. | 264/400 |
| 5,904,824 A | 5/1999 | Oh | 204/601 |
| 5,922,591 A | 7/1999 | Anderson et al. | 435/287.2 |
| 5,932,315 A | 8/1999 | Lum et al. | 428/172 |
| 5,932,799 A | 8/1999 | Moles | 73/53.01 |
| 5,945,203 A | 8/1999 | Soane | 428/209 |
| 5,958,344 A | 9/1999 | Levine et al. | 422/103 |
| 6,043,080 A | 3/2000 | Lipshutz et al. | 435/287.2 |
| 6,073,482 A | 6/2000 | Moles | 73/53.01 |
| 6,106,685 A | 8/2000 | McBride et al. | 204/600 |
| 6,117,396 A | 9/2000 | Demers | 422/100 |
| 6,123,316 A | 9/2000 | Biegelsen et al. | 251/129.01 |
| 6,154,226 A | 11/2000 | York et al. | 346/140.1 |
| 6,167,910 B1 * | 1/2001 | Chow | 137/827 |

OTHER PUBLICATIONS

Xia, Younan, et al., "Uncovonventional Methods for Fabricating and Patterning Nanostructures", (Mar 1999) *Chem. Rev.* 99:1823–1848.

Folch, A., et al., "Molding of Deep Polydimethylsiloxane Microstructures for Microfluidics and Biological Applications" (Feb 1999) *Transitions of the ASME* 121:28–34.

Duffy, David C., et al., "Rapid Prototyping of Microfluidic Systems in Poly(dimethylsiloxane)", (Dec 1998) *Analytical Chemistry* 70:4974–4984.

Grzybowski, B. A., et al., "Generation of Micrometer–Sized Patterns for Microanalytical Applications Using a Laser Direct–Write Method and Microcontact Printing", (Nov 1998) *Analytical Chemistry* 70:4645–4652.

González, C., et al., "Fluidic interconnects for modular assembly of chemical microsystems", (Jan 1998) *Sensors and Actuators B* 49:40–45.

Qin, Dong, et al., "Microfabrication, Microstructures and Microsystems", (1998) *Topics in Current Chemistry* 194:1–19.

Fuhr, G., et al., "Biological Application of Microstructures", (1998) *Topics in Current Chemistry* 194:83–116.

Shoji, Shuichi, "Fluids for Sensor Systems", (1998) *Topics in Current Chemistry* 194:163–188.

Córdova, Emilio, et al., "Noncovalent Polycationic Coatings for Capillaries in Capillary Electrophoresis of Proteins" (Apr 1997) *Analytical Chemistry* 69:1370–1379.

McCormick, Randy M., et al., "Microchannel Electrophoretic Separations of DNA in Injection–Molded Plastic Substrates" (Dec 1997) *Analytical Chemistry* 69:2626–2630.

Martynova, Larisa et al., "Fabrication of plastic microfluid channels by imprinting methods" (1997) *Anal. Chem.* 69:4783–4789.

Kovacs, Gregory T.A., et al., "Silicon Micromachining Sensors to Systems" (Jul. 1996) *Analytical Chemistry News & Features* 407A–412A.

Shoji, Shuchi, et al., "Microflow devices and systems" (Oct 1994) *J. Micromech. Microeng.* 4:157–171.

McNeely, M.R., et al., *Hydrophobic Microfluidics*, SPIE Article–H . . . crofluidics.doc.

Schomburg, W. K., et al., "Microfluidic components in LIGA technique" (Feb 1994) *J. Micromech.* 4:186–191.

Weigl, B., et al., "Passive Microfluidics—Ultra–Low–Cost Plastic Disposable Lab–On–A–Chips".

Verpoorte, Elisabeth M. J., et al., "Three–dimensional micro flow manifolds for miniaturized chemical analysis systems" (Oct 1994) *J. Micromech. Microoeng.* 4:246–256.

* cited by examiner

A

B

C

FLUIDIC IMPEDANCES IN MICROFLUIDIC SYSTEM

FIELD OF THE INVENTION

The present invention relates to microfluidic devices and the control of fluid flow within those devices. These devices are useful in various biological and chemical systems, as well as in combination with other liquid-distribution devices.

BACKGROUND OF THE INVENTION

There has been a growing interest in the manufacture and use of microfluidic systems for the acquisition of chemical and biological information. In particular, microfluidic systems allow complicated biochemical reactions to be carried out using very small volumes of liquid. These miniaturized systems increase the response time of the reactions, minimize sample volume, and lower reagent cost.

Traditionally, these microfluidic systems have been constructed in a planar fashion using silicon fabrication industry techniques. Representative systems are described, for example, in some early work by Manz et al. (Trends in Anal. Chem. (1990) 10(5): 144–149; Advances in Chromatography (1993) 33: 1–66). These publications show microfluidic devices constructed using photolithography to define channels on silicon or glass substrates and etching techniques to remove material from the substrate to form the channels. A cover plate is bonded to the top of the devices to provide closure.

More recently, a number of methods have been developed that allow microfluidic devices to be constructed from plastic, silicone or other polymeric materials. In one such method, a negative mold is first constructed, and plastic or silicone is then poured into or over the mold. The mold can be constructed using a silicon wafer (see, e.g., Duffy et al., Analytical Chemistry (1998) 70: 4974–4984; McCormick et al., Analytical Chemistry (1997) 69: 2626–2630), or by building a traditional injection molding cavity for plastic devices. Some molding facilities have developed techniques to construct extremely small molds. Components constructed using a lithography, electroplating and molding (LIGA) technique have been developed at the Karolsruhe Nuclear Research center in Germany (see, e.g., Schomburg et al, Journal of Micromechanical Microengineering (1994) 4: 186–191), and commercialized by MicroParts (Dortmund, Germany). Jenoptik (Jena, Germany) also uses LIGA and a hot-embossing technique. Imprinting methods in PMMA also have been demonstrated (see, Martynova et al, Analytical Chemistry (1997) 69: 4783–4789) However, these techniques do not lend themselves to rapid prototyping and manufacturing flexibility. Additionally, these techniques are limited to planar structures. Moreover, the tool-up costs for both of these techniques are quite high and can be cost-prohibitive.

Traditionally, fluid manipulation in these fluidic systems is controlled by electrokinetic and/or electrophoretic transport. These techniques involve the use of voltages and currents to control fluidic movement. Electrodes are placed within the channels and sufficient voltage is applied to cause the hydrolysis of water within the device. This hydrolysis produces a charge gradient throughout the channels which causes either fluid to flow, or molecules within the fluid to move. These techniques have numerous problems including, but not limited to the need for metallic electrodes within the chambers, connection of these electrodes to an outside voltage/current source, and the need for this source. Additionally, the hydrolysis of water often causes the formation of bubbles and other radicals which may have adverse effects on the devices or reactions occurring within the device.

Accordingly, there is a need for microfluidic devices capable of controlled fluid transport without requiring the use of current and voltage.

SUMMARY OF THE INVENTION

The present invention provides a microfluidic device that can control fluid flow. In one embodiment, the microfluidic device can be rapidly prototyped with minimal tool-up costs, can be easily manufactured at low cost, and is robust.

The microfluidic device contains a fluidic impedance that can control fluid flow. The device can accommodate the use of a vast array of liquid reagents or solutions including, but not limited to, aqueous solutions and organic solutions. The microfluidic devices of the present invention can be constructed using a variety of manufacturing techniques.

In one embodiment, the device consists of one or more microfluidic channels that are located on different layers of a three dimensional device. The channels are overlapped in certain areas in order to create fluidic impedances. Fluidic impedances hinder fluid flow through the device. The shape and the amount of overlap in the impedance can be controlled in order to alter the differential pressure necessary to cause fluid to flow through the impedance. In a preferred embodiment, the microfluidic device is formed from layered stencils into which channels have been cut, and the layered stencils are held together with an adhesive.

In other embodiments, microfluidic impedances can be incorporated into devices constructed using other techniques. In one embodiment, the microfluidic impedances are designed into a solid microfluidic device that is constructed using molding technology. In other embodiments, microfluidic impedances are incorporated into devices constructed using etching techniques usually associated with semiconductor processing. These devices can be constructed from etched silicon, glass, or other materials. These microfluidic impedances can be incorporated into devices constructed using other techniques as well.

In certain embodiments, a microfluidic device contains one or more of these fluidic impedances. In certain embodiments, all of the fluidic impedances are identical. In other embodiments, the impedances differ within a single device.

Definitions

The term "channel" as used herein is to be interpreted in a broad sense. Thus, it is not intended to be restricted to elongated configurations where the transverse or longitudinal dimension greatly exceeds the diameter or cross-sectional dimension. Rather, the term "channel" is meant to comprise cavities or tunnels of any desired shape or configuration through which liquids may be directed. Such a fluid cavity may, for example, comprise a flow-through cell where fluid is to be continually passed or, alternatively, a chamber for holding a specified, discrete amount of fluid for a specified amount of time. "Channels" may be filled, with a material that allows fluid flow through the channel, or may contain internal structures comprising valves or equivalent components. A channel has a smallest dimension that is at least about 1 micron but is less than about 500 micron.

The term "microfluidic" as used herein is to be understood, without any restriction thereto, to refer to structures or devices through which a fluid is capable of being passed or directed, wherein one or more of the dimensions is less than about 500 microns.

The microfluidic devices described here are "generic" in that they are modular and can be easily reconfigured into or adapted to any design. In addition, these devices are capable of being used with a variety of pumping and valving mechanisms, including pressure, peristaltic pumping, electrokinetic flow, electrophoresis, vacuum and the like. In addition, the microfluidic devices of the present invention are capable of being used in collaboration with optical detection (e.g., fluorescence, phosphorescence, luminescence, absorbance and colorimetry), electrochemical detection, and any of various suitable detection methods. Suitable detection methods will depend on the geometry and composition of the device. The choice of such detection methods will be within the purview of the skilled artisan.

The term "microfluidic impedance" as used herein is to be understood, without any restriction thereto, to refer to structures within the microfluidic device that hinder fluid flow. The shape, geometry and material that comprise these devices is not limited to the descriptions herein.

The terms "positive pressure" and "negative pressure" as used herein refer to pressures differing from a reference pressure. A preferred reference pressure is atmospheric pressure.

DETAILED DESCRIPTION OF THE INVENTION

Figure 1:
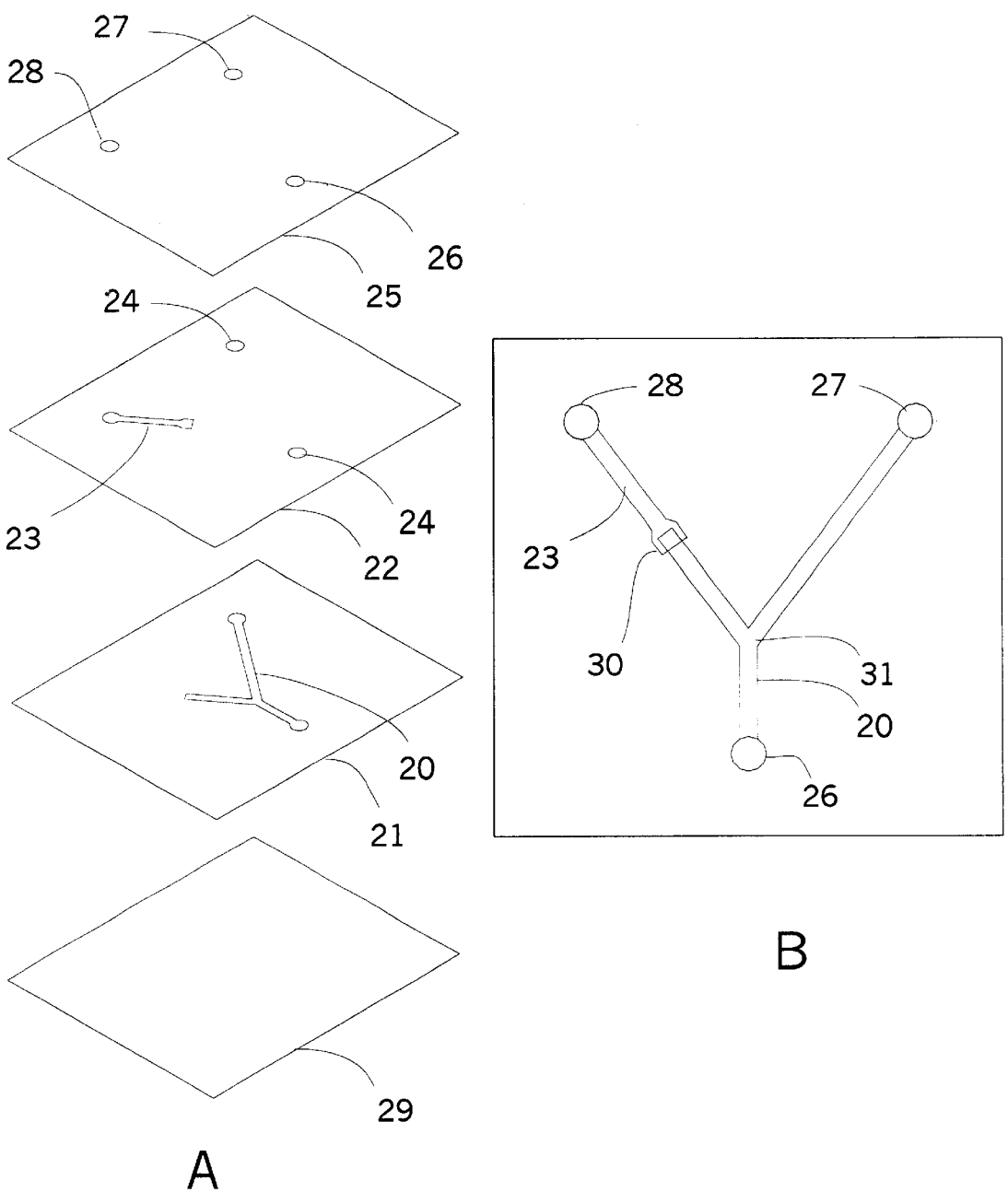
FIGS. 1A & B are a figure of a basic device containing a microfluidic impedance.

This invention describes microfluidic devices that contain built-in fluidic impedances for controlling fluid flow. Microfluidic impedances are built into the system so that the flow of fluid occurs in a controlled manner. These impedances hinder fluid flow at certain channel junctions, until the differential pressure across the impedance is sufficient to overcome the impedance, or the nature of the fluid-impedance interface is altered to allow fluid flow to occur. These microfluidic impedances can be incorporated into one or more positions within the device.

A microfluidic impedance is formed by the intersection of two or more channels within layers of a device at an overlap region. Channels are in fluid communication at the overlap region forming the microfluidic impedance. An overlap region has an overlap area defined as the area between the two channels that is open to both channels. For layers substantially in an XY plane, an overlap area is defined in the XY plane that is open to each of the channels in the Z direction. For example, if a 1 mm wide rectangular channel and a 0.5 mm wide rectangular channel are overlapped by 0.6 mm in an arrangement similar to FIG. 2B, the overlap area is 0.3 square millimeters.

An overlap region and overlap area can be of any size and geometry so that the structure has the property of hindering flow of a fluid. The impedance can be overcome, ie., fluid allowed to flow through the impedance, by increasing the differential pressure at the impedance, for example, by increasing the inlet pressure or by decreasing the outlet pressure. The impedance also can be overcome by changing the nature of the fluid hindered at the impedance.

In one embodiment, the overlap region has an area of less than about 5 square millimeters. In other embodiments, the overlap region can have an area of less than about 4 square millimeters, less than about 2 millimeters, less than about 1 square millimeter, or less than about 0.5 millimeters.

A microfluidic device also can contain a support layer. Such a support layer can be substantially rigid or can be a flexible layer. A support layer can define one surface of a channel in a lower layer. A microfluidic device also can contain an upper or top layer which can form the upper surface of channels in an upper layer.

Importantly, a microfluidic device containing an impedances is tuned for particular applications. Some of the parameters that affect the design of a microfluidic device include the type of fluid to be used, flow rate through the device, temperature, and material composition of the devices. Other parameters can affect the optimal design as well.

Microfluidic devices can be constructed of a wide variety of suitable materials. Such materials include polymers, papers, fabrics and foils. Polymers include, for example, polyesters, polyimides, vinyls, acrylics, polycarbonates, polytetrafluorethylenes, polyurethanes, polyethylenes, polypropylenes, polyvinylidene fluorides, nylons, polyethersulfones, ABS, polyphenylene oxides, silicones and derivatives thereof, as well as similar and equivalent materials. Devices can be constructed from a single material or from a combination of materials.

In embodiments where a device is constructed from modular layers, such layers can be joined with an adhesive. The adhesive can be, for example, a rubber-based adhesive, an acrylic-based adhesive, a silicone adhesives or a gum-based adhesive. The material used for forming the layer also can be self adhesive. For example, a layer used can be an adhesive tape. Adhesive tapes can, for example, have a polymer layer with one or more sides coated with an adhesive. Many adhesive tapes are known including, for example, pressure-sensitive tapes, chemically-activated tapes, heat-activated tapes and optically-activated tapes. In another embodiment, individual stencil layers can be joined with mechanical pressure. A number of techniques for constructing microfludic devices from stencil layers are disclosed in application Ser. No. 09/453,029 filed Dec. 2, 1999, the entire disclosure of which is incorporated herein by reference. Other techniques for constructing microfluidic devices are disclosed in application Ser. No. 09/453,026 filed Dec. 2, 1999, the entire disclosure of which is incorporated herein by reference.

Devices also can be constructed wherein the channel containing layers are integral, for example, in a solid block. Such devices can be constructed for example using microfabrication techniques, for example, molding, etching, and photopolymerization.

The microfluidic impedances described in the present invention can be constructed in a microfluidic device by controlling the geometry and surface chemistry of the channels that form the fluidic impedance. An impedance is constructed so that fluid flow is hindered at that point, until the differential pressure across the impedance within the device is sufficient to overcome that impedance. By controlling the geometry and surface chemistry of the junction, the differential pressure necessary to overcome the impedance can be altered. A microfluidic device can contain one or more such impedances.

In the embodiment shown in FIG. 1, a microfluidic device is constructed by sandwiching stencil layers on top of one another. Channels are constructed by removing portions of the stencil layers to form channels. Three dimensional fluid systems are created by forming channels in more than one stencil layer, and connecting said channels by overlapping the channels in each stencil layer. A channel can be cut through a stencil layer, or can be cut in a layer so that the channel is recessed within that layer. Referring to FIG. 1A, a channel network (20) is cut in a stencil layer (21). In a preferred embodiment, the stencil layer comprises single sided adhesive tape, as do the other stencil layers. This stencil layer is adhered to another stencil layer (22) that has another channel (23) and apertures (24) cut into it. This stencil layer is adhered to a solid support (25) that has an inlet port (26) and outlet ports (27,28). A final stencil layer (29) is adhered to the first stencil layer (21) to complete the formation of the channels.

Fluid flow can be activated within the devices in any number of ways including increasing the pressure at the inlet (using a syringe pump, hand activated syringe or pipettor, gas pressure, etc.), or decreasing the pressure at an outlet (such as with vacuum), capillary forces within the channels, or other methods of flow control. In the examples shown in this patent, fluid flow was activated by applying positive pressure at the inlet port using a syringe pump.

The final device is shown in FIG. 1B. The channels are constructed in such a manner that the overlap (30) of the channel structure on the left produces a microfluidic impedance sufficient to block fluid flow at certain pressures and with certain fluids. When the fluid is injected into the inlet port (26), it passes through the first channel (20) until it reaches the junction point (31). The fluid splits evenly down both chambers until it reaches the overlap region (30). The fluid then preferentially travels down the right channel towards the outlet port (27) and does not continue down the left arm past the overlap region (30).

In order for fluid to flow through the microfluidic impedance (30), the differential pressure across the impedance must be increased or the fluid-impedance interface must change enough for the current pressure to overcome the impedance. This can be accomplished in a number of ways. In certain embodiments, external pressure is applied to the outlet port of the right arm (27). This can be accomplished by simply capping the outlet port and continuing to flow fluid (or air) into the inlet port. Alternatively, positive pressure can be applied at the outlet port (27).

The amount of pressure change that must occur within the microfluidic device in order to overcome a given impedance will greatly depend on the application of interest and sample used. For a system with no built-in microfluidic impedances, the pressure within the channels is a function of a number of factors, including but not limited to the dimensions of the channels, geometry of the channels, flow rate of the fluid, composition of the fluid, and surface chemistry of the channels. Thus, the inherent pressure can be varied depending on the application. In one embodiment, the amount of pressure required to overcome a microfluidic impedance is just slightly above the pressure that is maintained in the device during operation.

In another embodiment, the pressure required to overcome the microfluidic impedance is significantly greater than the ambient pressure within the device. In this embodiment, variations in the sample volume or flow rate will not inadvertently cause fluid to flow through a microfluidic impedances.

In a preferred embodiment, the pressure within the channels can be increased or decreased by altering the flow rate at the inlet port.

In a preferred embodiment, the amount of pressure at various points within the microfluidic device can be monitored using pressure sensors incorporated into the device. In another preferred embodiment, flow sensors can be incorporated at various points within the microfluidic device to monitor the flow rate which is related to the pressure. In these embodiments, feedback can be provided to the system that controls the inlet and outlet ports and flow mechanism in order to trigger the microfluidic impedances and/or optimize the device performance.

In a preferred embodiment, more than one microfluidic impedance is built into a fluid device. In certain embodiments, the impedances are constructed to be identical. In other embodiments, different impedances are used to cause preferential flow within the device. In this manner, more complicated fluidic systems are possible. The differential pressure necessary to overcome these microfluidic impedances can be controlled in a number of manners. These include, but are not limited to altering the geometry and shape of the overlap (including the height of the channels) and altering the chemical nature of the channel at the overlap.

When more than one microfluidic impedance is incorporated into a device and the impedances are designed to be overcome sequentially, the amount of pressure required to overcome each impedance should be sufficiently different go that slight variations in the structure of the devices does not cause the impedances to be overcome in the incorrect order. The amount of pressure required also should be sufficiently different from the starting operating pressure such that slight changes in the flow rate do not cause the impedances to be overcome in the incorrect order.

Figure 2:
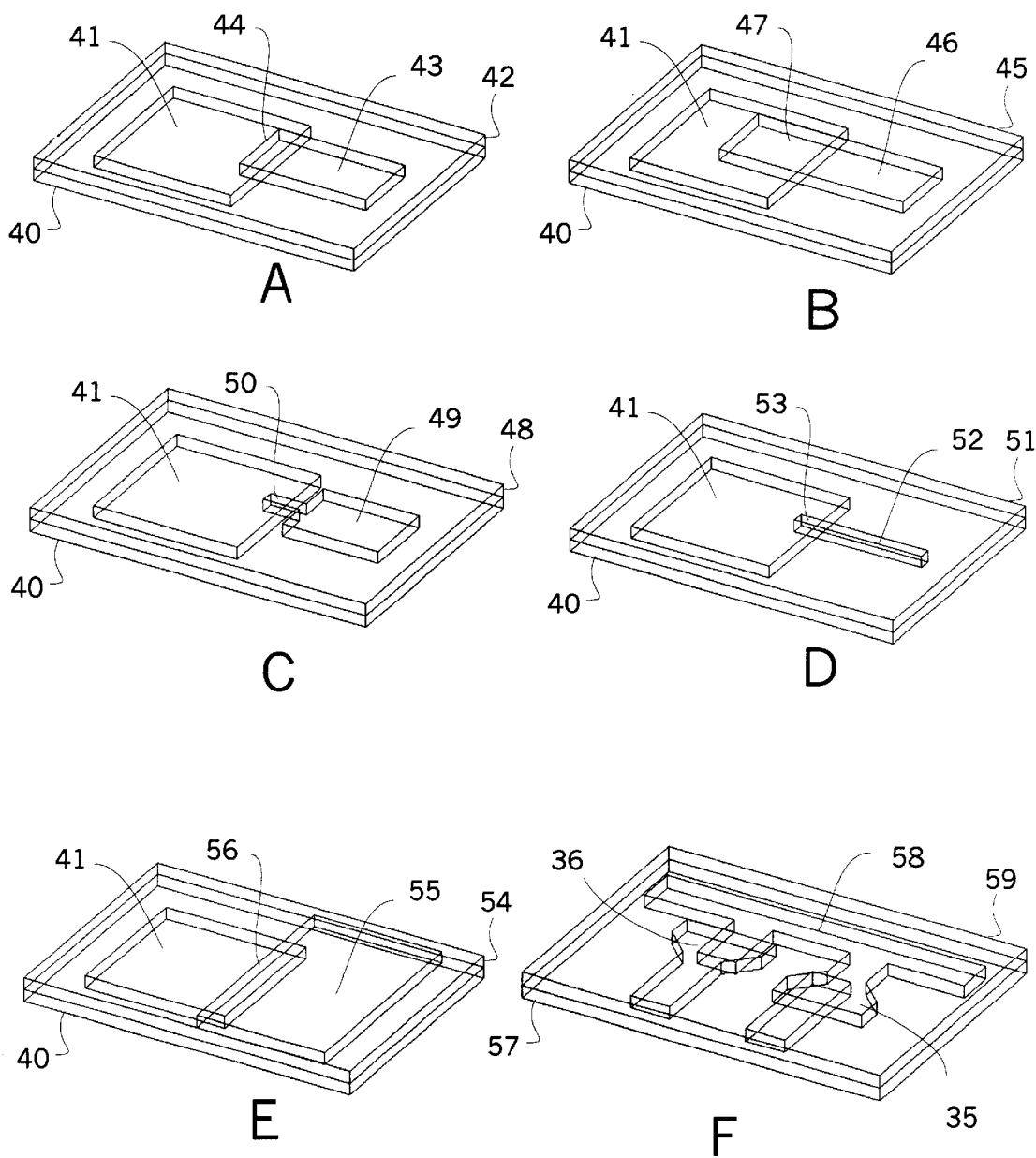
FIGS. 2A–F are a schematic of various ways to control the fluidic impedance based on overlap geometry.

Referring to FIG. 2, a number of possible overlap geometries are shown. These geometries can be built into a single device to control the fluid flow within that device. In certain embodiments, more than one of these geometries (or others) is built into a single device. Referring to FIG. 2A, a microfluidic impedance is constructed by adhering two stencil layers together. The first layer (40) has a rectangular inlet channel (41). The second layers (42) has a rectangular channel (43) that is narrower than the first lower channel (41). Fluid enters along the inlet channel (41) and continues until it reaches the overlap junction (44). The fluid flow stops until sufficient pressure has built up within the channel to overcome the microfluidic impedance. Then, fluid passes onto the channel on the next layer (43).

In a preferred embodiment, the impedance can be altered by increasing the length of the overlap of this junction. Referring to FIG. 2B, the lower stencil layer (40) is the same as in FIG. 2A. The upper stencil layer (45) contains a channel (46) that is the similar to the upper channel (43) in FIG. 2A, except that the overlap (47) with (41) extends further in this example, altering the microfluidic impedance.

In another preferred embodiment, the microfluidic impedance is adjusted by altering the vertical overlap at the junction. Referring to FIG. 2C, the lower stencil layer (40) is the same as in FIG. 2A. The upper stencil layer (48) has a channel (49) that narrows at the overlap region (50), altering the microfluidic impedance.

In another preferred embodiment shown in FIG. 2D, the second stencil layer (51) has a channel (52) that is narrower both at the overlap (53) and after the overlap (52).

In another preferred embodiment, the outlet channel can be wider than the inlet. In the configurations shown in FIGS. 2A–D, the inlet channel on the lower layer was wider than the outlet channels on the upper stencil layers. Referring to FIG. 2E, the inlet channel (41) remains the same as in FIGS. 2A–D. The upper stencil layer (54) has a channel (55) that is wider at the overlap region (56), altering the junction point (48) and the microfluidic impedance.

In another preferred embodiment, the shape of the overlap regions can be more complicated. Two types of overlap are shown on a single device in FIG. 2F. The first stencil layer (57) has a channel system (58) that branches off into three sections. The second stencil layer (59) has two separate channels that overlap with the lower level channel (58) in two regions (35,36). In one overlap region (35), the overlap is wider on the lower stencil layer; in the other overlap region (36), the overlap is wider in the stencil layer. Generally, when a buffer solution or other aqueous solution is used and the lower channel (58) is filled first, the overlap region (35) will typically break before the overlap region (36) when polymeric backing type tapes and acrylic based adhesives are used. Typically, it seems that the overlap region that has a large interface area breaks first when aqueous solutions are used. An interface area is the area of the fluid front when the fluid is blocked at a fluidic impedance. For a channel moving fluid in an XY plane, an interface area will have a Z component. Depending on the nature of the impedance, an interface area will be formed with air, a gas or other liquid that fills the device or with the side surface of the channel that defines part of the overlap area.

Other geometries and overlap arrangements are possible. Additionally, the outlet channel can be in the fluidic layer above, or below the layer containing the inlet channel.

In one embodiment, the fluid enters into the overlap region from a channel on a lower layer of the device. When the fluid front reaches the impedance region, it stops at the impedance region until sufficient differential pressure is applied to overcome the impedance and flow into the channel located on the next layer up.

In another preferred embodiment, a spacer layer is placed between the inlet channel (lower layer) and outlet channel (upper layer) that has one or more apertures to allow the fluid to pass. One or more spacer layers can be used. A spacer layer aperture can be of various shapes and sizes. In a certain embodiment, the aperture is shaped the same as the overlap regions or overlap area. In another embodiment, the aperture is larger or smaller than the overlap regions In another preferred embodiment, the fluid enters the junction region from a channel located on an upper level of the device. The fluid front stops at the junction region until sufficient pressure is applied to overcome the microfluidic impedance, at which time the fluid flows to the channel located on the lower region.

Figure 3:
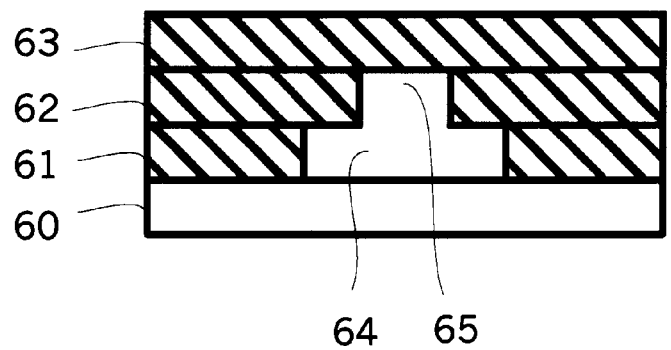
FIGS. 3A–C are a schematic of three various ways to control the fluidic impedance based on channel height and chemical makeup.
Figure 3:
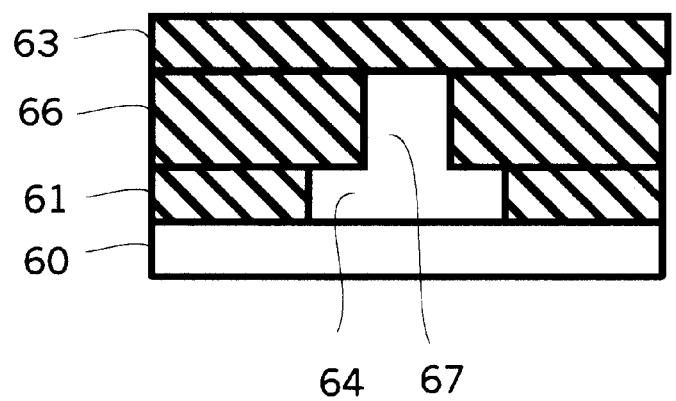
Figure 3:
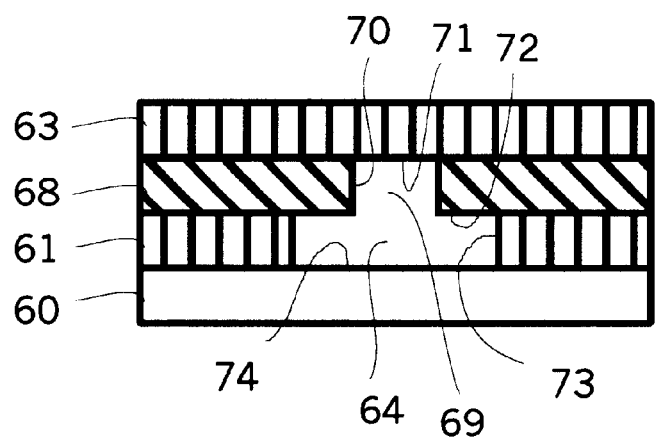

Other factors can also be incorporated to affect the nature of the microfluidic impedance. Referring to FIG. 3, cross sections are shown of various microfluidic impedances. Referring to FIG. 3A, a stencil layer (61) is adhered to a solid support (60). A channel (64) has been removed from this stencil. The next stencil layer (62) is adhered to the lower stencil (61). This stencil has a channel (65) as well. In this embodiment, the upper channel (65) has a narrower cross section than the lower channel (64). The channels have the same vertical dimension. The cross section of the overlap region is shown. A top layer (63) is applied to complete the device. In this embodiment, each of the stencil layers is constructed from the same material, and each layer has the same thickness.

In another embodiment, the thickness of one of the stencil layers is altered. Referring to FIG. 3B, the second stencil layer (66) is thicker than the initial layer (61). The overlap region in this embodiment is altered because the upper channel (67) has a larger vertical dimension than the lower channel (64). In this manner, the nature of the microfluidic impedances can be altered.

In another preferred embodiment, the overlap junction is altered by changing the chemical nature in the overlap region. Referring to FIG. 3C, the stencils are identical in shape and thickness as in 3A, but the second stencil layer (68) is constructed from a different material. This can be accomplished by forming the stencil from a different material or by altering the surface chemistry of this stencil layer. The surface chemistry can be altered in many ways, as one skilled in the art will realize. These methods of altering the surface chemistry include chemical derivatization as well as surface modification techniques such as plasma cleaning or chemical etching. Numerous types of surface chemical derivatization are possible including covalent attachment to the surface and non-covalent attachment. Various types of covalent attachment strategies have been developed and are possible including silanization reactions on the surface of hydroxyl terminated surfaces, such as glass, and thiol reactions on the surfaces of metals, such as gold. Other type of surface chemistries are also possible such as carboxylate chemistry on polystyrene surfaces. Other types of attachment chemistries are also possible.

Numerous types of non-covalent chemistries are also possible and have been demonstrated by others. In one embodiment, non-specific ionic interactions are used to attach molecules. In one embodiment, the surface of interest is negatively charged (or the pH is adjusted so that it carries negative charge). Molecules carrying a positive charge will bind to the surface. In one embodiment, one area of a molecule is charged and binds to the surface and the other parts of the molecule then face the solution and are available for further interaction. In an alternative embodiment, the surface is positively charged while the molecule of interest in negatively charged. Other types of non-specific interactions can also be used to connect to the surface such as van-der waals interactions. Using these techniques, surfaces can be derivatized with biomolecules, for example, nucleic acids, proteins and carbohydrates and with small molecules.

Channel (69) has an upper surface (71) formed by the bottom surface of top layer (63), side surfaces (70) formed by the material of layer (68) and, aside from the overlap region, a bottom surface formed by the top of layer (61).

Likewise, channel (64) has a bottom surface (74) formed by the top of support layer (60), side surfaces (73) formed from the material of layer (61) and an upper surface (72) formed by the bottom of layer (68). The surface chemistry of these various surfaces can be altered individually.

In an embodiment in which stencil layers are connected with an adhesive, or the layers are self adhesive, the surface properties are changed depending on which surface is adhesive. For example, the device shown in FIG. 3C can be constructed where layer 61 is double sided tape, layer 63 is single sided tape, lower surface 71 has the adhesive, and layer 68 is non-adhesive. In such an embodiment, upper surface 71 has an adhesive coating, while upper surface 72 has a non-adhesive surface as does side surface 70. In another embodiment, layers 61, 68, and 63 are each single sided adhesive tapes with adhesive on the lower side of each layer. In this embodiment, upper surfaces 71 and 72 are both adhesive.

The above described methods for altering the impedance within a microfluidic device can be used independently or in conjunction with one another. Other methods for altering the nature of the junction also are included, if not specifically stated.

One surprising aspect of the present invention is that the optimal parameters for a given overlap are greatly affected by the nature of the sample that is to be used within the device. It has been found that the optimal geometry for these overlaps changes depending upon the solution used. For example, the geometry shown in FIG. 2F has proven to be very useful when the solution used is buffer or water. However, different geometries have proved useful when the solution is of organic nature, such as acetonitrile. The addition of surfactants to the solutions has an effect on the preferred geometry as well.

In order to overcome the microfluidic impedances within a microfluidic device, the differential pressure across the impedance can be increased to allow fluid to flow across the impedance, or the nature of the impedance must change. This can be accomplished in any number of ways.

In a preferred embodiment, the differential pressure is increased by externally applying pressure. The channels and chamber within a microfluidic device can have outlet connections, so an off board manifold system can be used. The manifold can connect to the inlet and outlet ports of the microfluidic device and switch pressure on and off of these ports in order to provide pressure to the channels when necessary. In one embodiment, this manifold would consist of a valving system that is connected at one end to a nitrogen tank, or other pressurized system. The valving system could be controlled to selectively apply the pressurized nitrogen to the channels of the device. This system could be controlled manually, or by a computer or other built in control. Additionally, feedback to the valving system could be used for this control. In a preferred embodiment, sensors are used to monitor the fluid flow within the device. When the fluid reaches a certain point, the valving system could be automatically switched as per a given protocol.

In another preferred embodiment, fluid is delivered to the inlet port at a constant rate, and differential pressure across the impedance is altered by design of the device itself. In a preferred embodiment, the outlet port of the microfluidic channels is covered with a material that allows air to pass, but is relatively impermeable to liquids. In this embodiment, fluid fills the channel and pushes the air or gas that was previously in the channel out of the exit port, and through the material. When the channel is filled with fluid and the fluid front reaches the material, the fluid does not pass through the material and the pressure within the microfluidic device increases. This increase can be used to overcome microfluidic impedances within the device.

In a preferred embodiment, more than one type of outlet material can be used. These materials can be chosen so that their properties are such that they have slight resistances to air or gas, and very large resistances to fluid flow. In certain embodiments, the material can be a porous material. The pore size and material composition can be selected to produce the desired effects and impedances. Different materials can be used at various outlets. In this manner, the outlet materials can be used in conjunction with the overlap impedances to produce preferential fluid flow within a device.

In another preferred embodiment, the microfluidic impedances can be overcome by altering the fluid properties. Suprisingly, it has been found that the differential pressure required to overcome a microfluidic impedance is greatly affected by the composition of the sample present. Thus, by altering the fluid properties within the device, a microfluidic impedance may be overcome without increasing the pressure on the fluid. Examples include, but are not limited to, changing the viscosity, surface tension, chemical makeup, salt concentration, surfactant concentration, addition of particles to the fluid, changes in temperature of the fluid or the device, etc.

In a preferred embodiment, fluid enters a device that has a split junction and two impedances immediately after the junction. The impedances are constructed so that one of the impedances is overcome first when water is flowed into the devices. These impedances are constructed so that the opposite impedance is overcome preferentially when the fluid is organic in nature. In this embodiment, water may be injected into the device for a period of time. When an organic solvent is injected into the fluid inlet, the other impedance is broken and the fluid passes down the alternate channel. In this manner, fluid control can be changed without significantly altering the pressure within a device or applied to a device.

Upon consideration of the present disclosure, one of skill in the art will appreciate, that many other embodiments and variations may be made in the scope of the present invention. Accordingly, it is intended that the broader aspects of the present invention not be limited to the disclosure of the following examples, but only by the scope of the appended claims.

EXAMPLE 1

Figure 4:
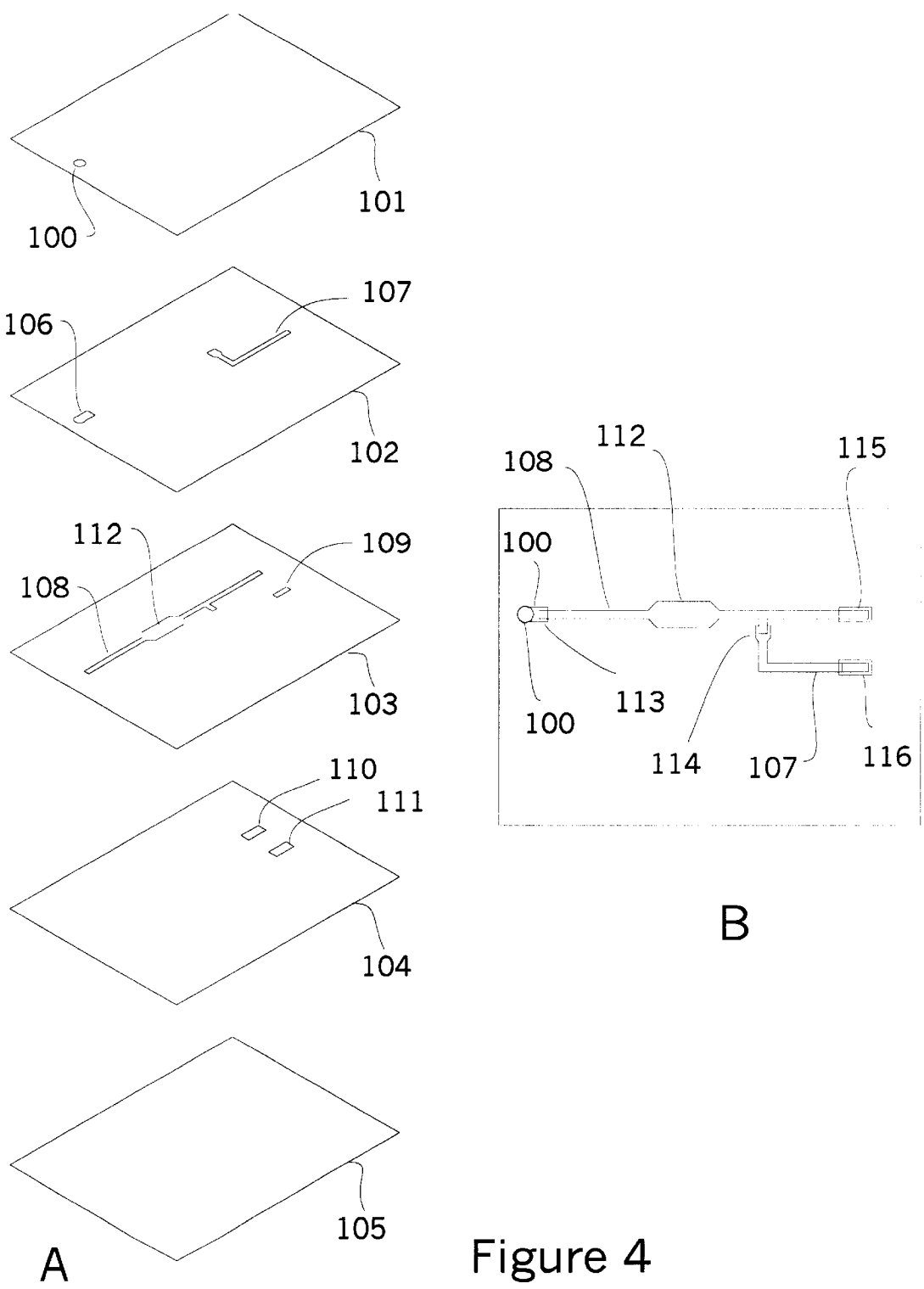
FIGS. 4A and B are a schematic of a microfluidic purification and concentration device with built-in microfluidic impedances.

Referring to FIG. 4A, a microfluidic device designed for purification applications was constructed. A hole 100 (40 mil (1 mm) diameter), representing an inlet port, was drilled in a ⅛" thick piece of planar polycarbonate 101. Channels were constructed by cutting channels out of a single sided piece of tape that consists of 1 mil (25 micron) polyester backing with 1 mil (25 micron) medical grade acrylic adhesive using a computer controlled plotter that had been modified with a cutting blade. Two of the stencil layers 102, 103 were formed from the single sided tape with channels 106–108 and aperture 109 constructed. Stencil layer 104 was constructed from double sided tape (0.5 mil thick polyester carrier with 1.8 mil thick acrylic adhesive on each side), with chambers 110, 111 constructed.

A filter "column" area 112 was constructed and can be filled with a variety of filter materials during the manufacturing process. In certain biological applications, the filter area could be filled with biological filters for performing purification or binding assays. For other applications, organic purifications may be performed by using filter materials. Filter materials include chromatographic and electrophoretic separation materials, for example, silica gel, that accommodates organic separations, reverse phase silica gel, polyacrylamide. These filling materials, in certain preferred embodiments, can be used to perform useful chemical and/or biological reactions. In one embodiment, the filling materials are filters, which are useful for separating and/or purifying materials. These filters can be chemical or biological filters, or size-exclusion filters. These filters may bind unwanted material or, alternatively, may bind the material of interest so that it may be eluted later. The filling materials include chemical and biological materials, and can be hydrophobic or hydrophilic in nature. The filling material can be charged or neutral. The filling material may be porous, with various pore sizes. In a preferred embodiment, the filling material used to fill a channel or chamber is polymeric. Examples include, but are not limited to, polycarbonate, acrylic, polyurethane, high-density polyethylene (HDPE), ultra-high molecular weight polyethylene (UHMW), polypropylene (PP), polyvinylidene fluoride (PVDF), polytetrafluoroethylene (PTFE), naphion, nylon, and polyethersulfone (PES). In a preferred embodiment, the material used to fill the channel is a carbohydrate, such as agarose, alginate, starch, or carrageenan. The polymer may be an electroactive polymer. In a preferred embodiment, the material used to fill the channel is silica gel. In another preferred embodiment, the material used to fill the channel is SEPHADEX® or SEPHACIL®. In another preferred embodiment, the material used to fill the channel is acrylamide or agarose. In another preferred embodiment, the material used to fill the channel is hydroxyapatite.

In a preferred embodiment, the filling material used to fill the channel and/or chamber is a biological material. Examples include, but are not limited to, binding proteins, antibodies, antigens, lectin, enzymes, lipids, and any molecules that may interact specifically or non-specifically with one or more of the species in the fluid.

Channels can be filled by any suitable technique including silk screening the material in place, placing a solid filter that has been shaped to be the appropriate size, or chemical derivation of the surface of the channels themselves to act as the filter material. In another preferred embodiment, the channels are constructed and a slurry of the filter material is injected into the channels after they are constructed. Powder or liquid can also be injected. Other techniques can also be used.

The stencil layers 102–104 were adhered together and adhered to the polycarbonate support layer (101). A final top layer 105 of hydrophobic porous material was adhered to stencil layer 104. In this embodiment, the porous material was ultra high molecular weight (UHMW) polyethylene, with an average pore size of this material is 2.5–4.5 microns.

The assembled device is shown in FIG. 4B. The device has two different overlap regions, 113, 114 and two regions where the fluidic channel connects to the porous material 115,116. All of the channels in this device are 2 mils high in the vertical dimension. At junction 113, channel 106 is 70 mils wide, channel 108 is 40 mils wide, and the two channels overlap 40 mils horizontally. At junction point 114, channel 108 is 40 mils wide, channel 107 is 70 mils wide and the channels overlap 40 mils, providing an overlap area of about 1 square millimeter.

In operation, a fluid sample is injected into the entry port 100. Connections to the port 100 can be made using a standard 10 microliter pipette tip that is simply pushed into the port. Alternatively, the entry port 100 can be countersunk and a standard 5 microliter glass capillary can be used. Other connection methods are possible. The fluid fills the initial channel 106 and stops at overlap region 113. This overlap region is added at the beginning to control the initial flow at the inlet. Surprisingly, it has been found that the initial input of sample into a microfluidic device is often sporadic and uncontrollable. The addition of this initial impedance makes the fluid flow much more controllable.

The plug of sample enters the channel 108 and passes through the filter area 112. The fluid then passes down the remainder of 108. When the fluid encounters the microfluidic impedance 114, it does not proceed into 107, but rather continues down 108 towards 115. Once the chamber at 115 is filled, the fluid does not want to cross the filter materials 105. Pressure is built up within the chamber and the microfluidic impedance at 114 is overcome. Fluid then passes into the output channel 107.

In practice, the volume of the output chamber 110 is adjusted to accommodate all of the sample. The sample is injected into the device and the material of interest binds to an affinity filter at 112. A plug of elution buffer (or other solvent) is then injected into the device. When the elution buffer reaches the filter area, the waste chamber 110 becomes full and the microfluidic impedance at 114 is overcome. Thus, the elution buffer is diverted into channel 107. Detection technology can be added to this chamber 111. Alternatively, an output port can be added at this point and the purified sample can be taken off-board for further analysis.

EXAMPLE 2

Figure 5:
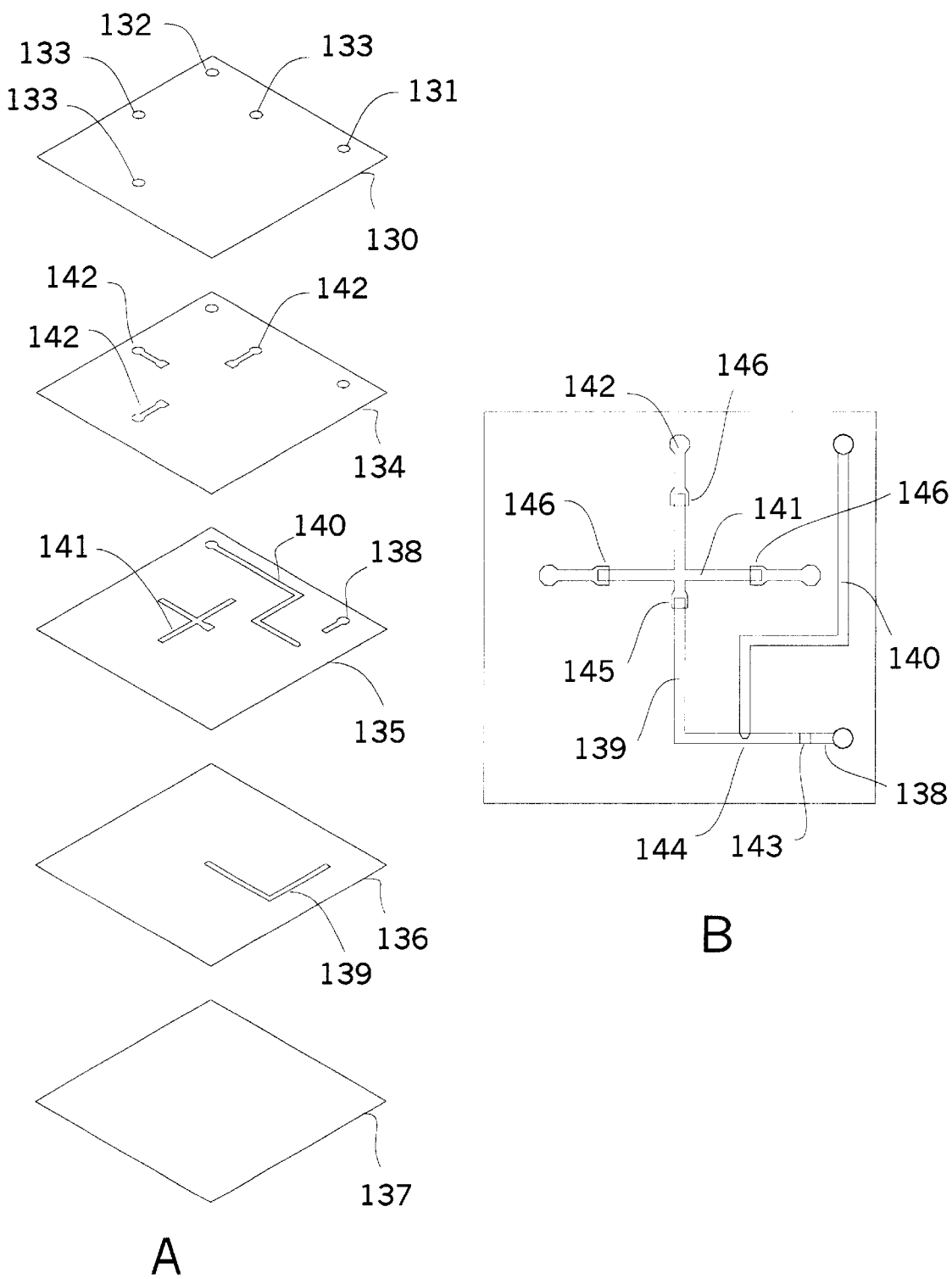
FIGS. 5A and B are a schematic of a microfluidic metering device with built-in microfluidic impedances and off-board connections.

FIG. 5 is a schematic of a microfluidic device that brings in a quantity of sample that has a large standard deviation, meters a known amount with a smaller standard deviation, divides the metered amount into three equal components, and brings the sample off-board for further analysis.

Referring to FIG. 5A, an inlet port 131, control port 132, and outlet ports 133 were created in a ⅛" thick polycarbonate base 130. Four stencil layers were created 134–137 that have channels 138–142 cut into them. In this example, single sided pieces of tape that consists of 3 mil (76 micron) polypropylene backing with permanent water based adhesive is used as the stencil material. The stencil layers were adhered together and onto the polycarbonate base. The assembled device is shown in FIG. 5B and contains four different types of overlap regions 143–146. All of the channels are 3 mils high, thus the overlap regions are 6 mils. At overlap 143, both channels are 40 mils wide and they overlap for 40 mils. At overlap 144, channel 140 is 40 mils wide and tapers down to 20 mils in the overlap region; channel 139 is 40 mils wide and channel 146 extends across 139 for 20 mils. Overlaps 145 and 146 are identical. The entry channels 139, 141 are 40 mils wide, the exit portions are 70 mils wide and the overlap is 40 mils in length.

In operation, a sample plug is injected at the inlet port 131 using a syringe pump at a constant flow rate. A fluidic impedance 143 is constructed immediately after the inlet to control the initial fluid flow. The fluid then passes into channel 139 and fills the channel until it reaches impedance 145. At this point, the excess fluid within the sample breaks through the microfluidic impedance at 144 before the microfluidic impedance at 145. The excess fluid passes down channel 140. Once all of the excess fluid has been sent to the waste channel (140), the control port 132 can be plugged, which increases the pressure within the channels. The amount of sample now ready for further analysis is defined by the volume of channel 139 between the two microfluidic impedances 144 and 145. If a different sample volume is desired, the microfluidic impedance 144 can be moved along channel 139 to alter the volume.

Once the air in channel 140 has been compressed sufficiently to build up enough pressure, microfluidic impedance 145 is overcome. The sample now enters chamber 141 and fills the entire chamber up to the impedances 146. Once this chamber has been completely filled, the output microfluidic impedances 146 are overcome and the samples can now be exported off the device for further analysis.

In certain embodiments, the output holes 133 are countersunk and a capillary is inserted into the holes. The countersinks are adjusted to create a tight fit around the capillaries.

EXAMPLE 3

Figure 6:
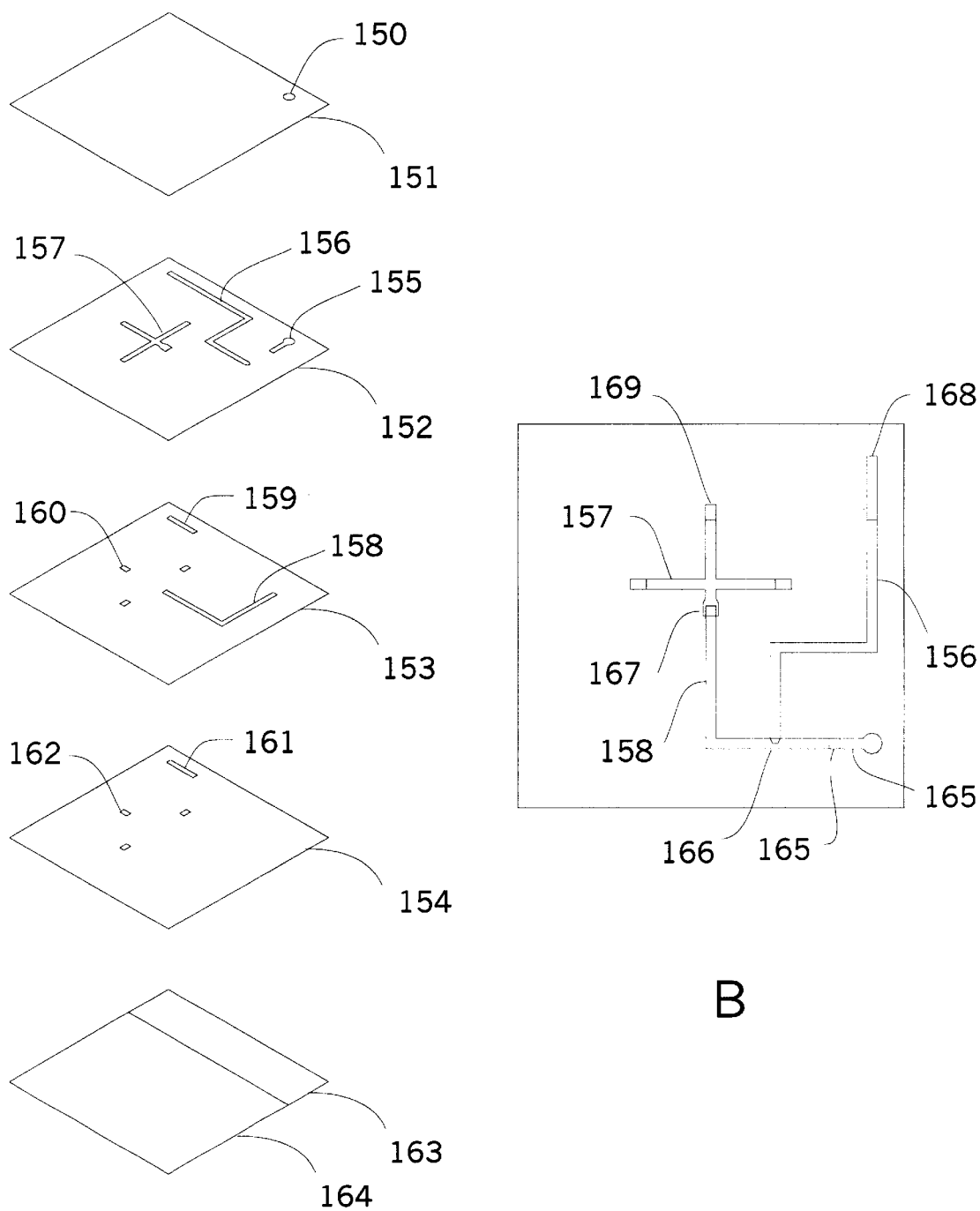
FIGS. 6A & B are a schematic of a microfluidic metering device with built-in microfluidic impedances and built-in valving.

FIG. 6 is a schematic of a microfluidic device that brings in a quantity of sample that has a large standard deviation, meters a known sample amount with a smaller standard deviation, divides the metered amount into three equal aliquots. In this device, all of the metering occurs automatically with a built-in valving system. A detection technology can be added to the device to analyze the metered samples.

Referring to FIG. 6A, an inlet port 150 was created in a ⅛" thick polycarbonate base 151. Three stencil layers were created 152–154 that have channels 155–158 and chambers 159–162 cut into them. Two of the stencil layers, 152,153 were constructed from single sided polypropylene tape with a permanent water-based adhesive having a total thickness of 3 mils. The other stencil 154 was constructed from double sided tape (0.5 mil thick polyester carrier with 1.8 mil (46 micron) thick acrylic adhesive on each side). The stencil layers were adhered together and onto the polycarbonate base. Two different types of porous material were adhered to stencil 154. Material 163 is polytetrafluoroethylene having an average pore size of 30–60 microns and covers the chamber 161. The other material 164 is ultra high molecular weight polyethylene having an average pore size of 2.5–4.5 microns and covers the outlet channels 160 and 162.

The assembled device is shown in FIG. 6B and contains three different types of overlap regions 165–167 and two types of outlet channels, 168,169. The overlaps in this example are the same as in Example 2.

In operation, a fluid plug is injected into port 150. The fluid enters the device and passes across microfluidic impedance 165. The fluid fills channel 158 until it reaches microfluidic impedance 167. At this point, the fluid now encounters two impedances, 166 and 167. In order for the fluid to continue to flow, air must be pushed through one or both of the porous materials 163 and 164 at outlets 168 and/or 169. In this example, material 163 covering outlet channel 168 is chosen to have a smaller pressure drop across than that across material 164 covering outlet channel 169. Thus, microfluidic impedance 166 is overcome first. The excess of the fluid sample passes into channel 156 until the front reaches the interface of the porous material 163. At this point, the system would prefer to pass air across the interfaces at 169 than liquid across material 163. The microfluidic impedance at 167 then is overcome. The fluid sample volume, which equals the volume of channel 158 from microfluidic impedance 166 to 167, is split equally into channel 157.

Detection technology can be added to the chambers in 157 for on board analysis of the samples.

The volume of the channels can be adjusted to accommodate various sample sizes. Because of errors in delivering small volumes of samples, sample injection volumes can have substantial variability within a range from a high end to a low end. Importantly, the volume of sample area (within 158) must be smaller than the low end of the sample volume injected. Additionally, the volume of channel 156 and chambers 159 and 161 must be greater than the high end of the sample volume injected. For example, for a sample injection volume of 1 microliter±30%, the volume of chamber 158 between the two microfluidic impedances (166 and 167) must be less than 700 nl. Additionally, the volume of 156,159, and 161 must be greater than the total possible volume, 1300 nl minus the sample volume. In a preferred embodiment, the metering volume would be 600 nl and the waste system would be 1 microliter.

EXAMPLE 4

Figure 7:
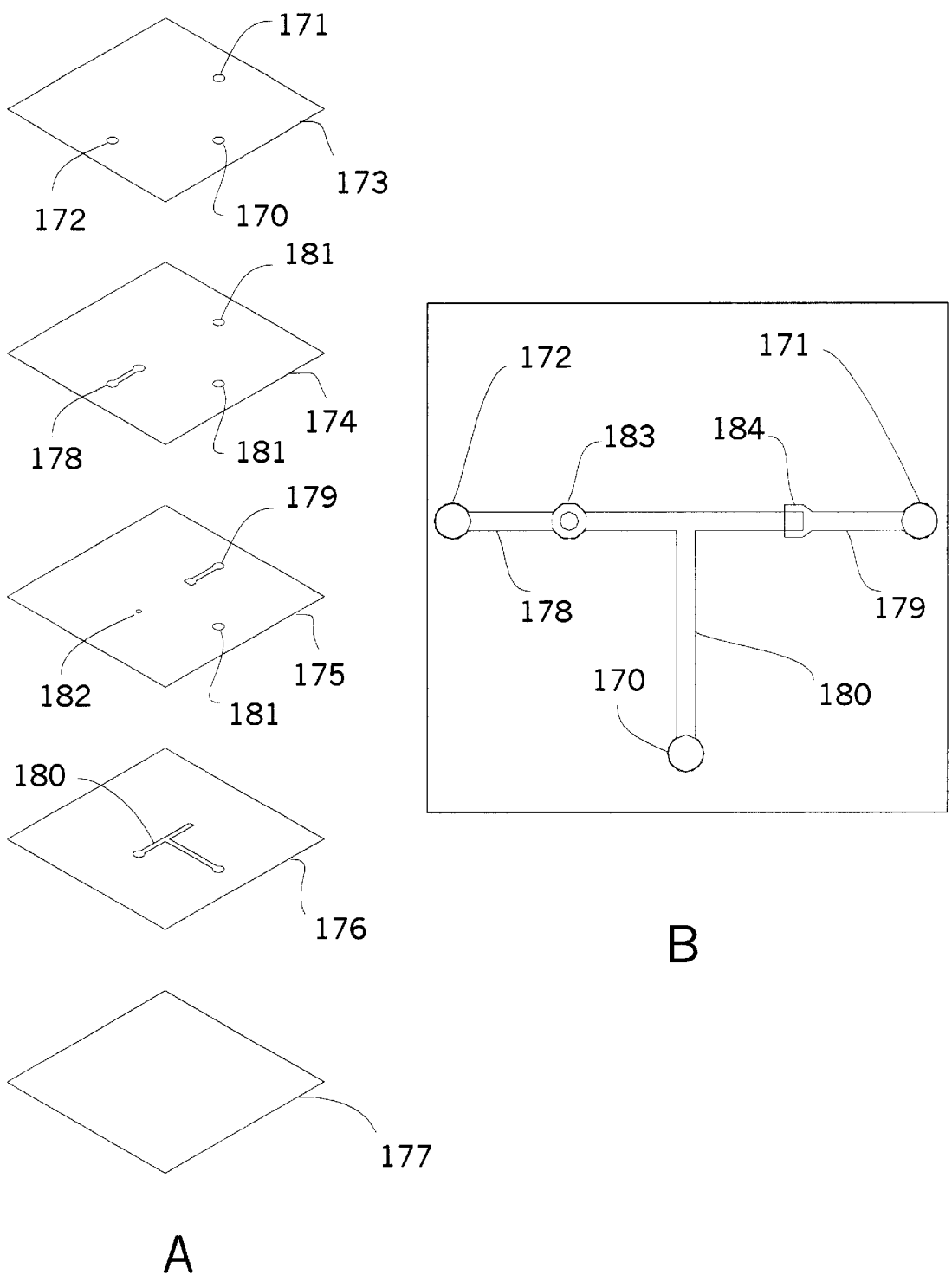
FIGS. 7A & B are a schematic of a microfluidic device containing two impedances.

In this example, a device is shown that contains two impedances. These impedances have been engineered to behave differently when subjected to different fluids. Referring to FIG. 7A, an inlet port 170 and two outlet ports 171,172 were created in a ⅛" thick polycarbonate base 173. Four stencil layers were created 174–177 that have channels 178–180 and two types of apertures 181,182 cut into them. The stencils were constructed by cutting channels out of a piece of single sided polypropylene tape with a permanent water-based adhesive having a total thickness of 3 mils. Support stencil layer 177 had no channels or holes. The stencil layers were adhered together and onto the polycarbonate base.

The assembled device is shown in FIG. 7B and contains two different overlap regions 183,184 that have been engineered to respond differently to different types of materials.

Two examples of operation are described. In the first example, 1X phosphate buffered saline (PBS) buffer was injected at port 170. The outlet ports 171,172 are both left open. The fluid filled channel 180 until it reaches both overlap regions 183,184. At this point, the water passed through the overlap region 183 first. The fluid then filled channel 178. When exit port 172 was capped, pressure built up within the system and overlap region 184 was overcome.

In the second example, an industrial scented oil (Pine Forest Scent, #9434 from Goodscents Comp., Oak Creek, Wis.) was injected into the system. Again, channel 180 filled until the oil reached overlap regions 183,184. In this case, overlap region 184 was overcome first. The fluid filled channel 179 exiting at port 171 until it was capped. Then, overlap region 183 was overcome.

EXAMPLE 5

Figure 8:
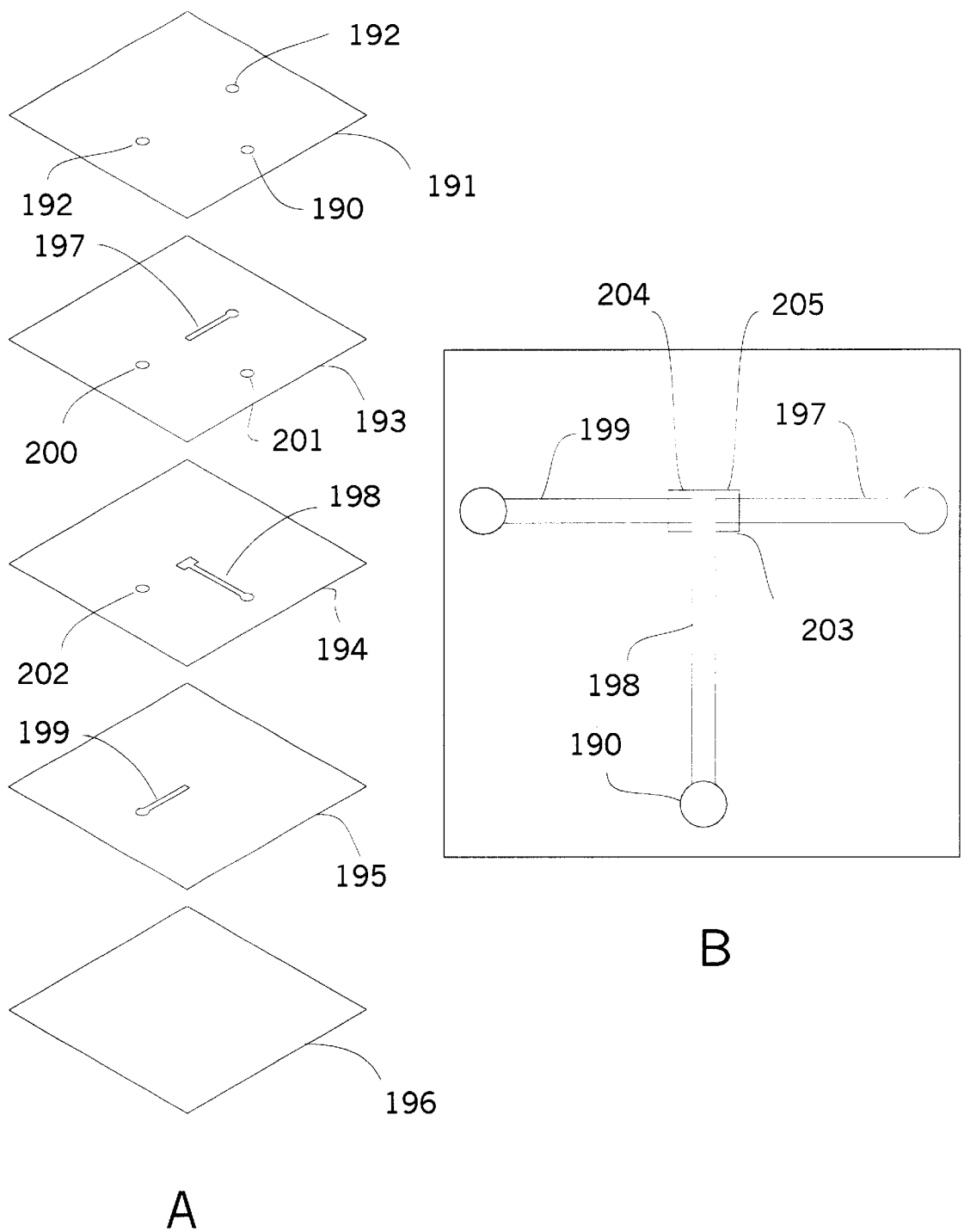
FIGS. 8A & B are a schematic of a microfluidic device with 3 channels in 3 layers meeting at a single overlap region to form an impedance.

In another preferred embodiment, more than two channels can meet at any microfluidic impedance. Referring to FIG. 8, a microfluidic device was constructed that had channels overlap from 3 different layers of a three dimensional device.

Referring to FIG. 8A, an inlet port 190 was created in a ⅛" thick polycarbonate base 191. Exit ports (192) also were created in this piece of polycarbonate. Four stencil layers were created 193–196 that have channels 197–199 and apertures 200–202 cut into them. All four stencil layers, 193–196 were constructed from single sided polypropylene tape with a permanent water-based adhesive having a total thickness of 3 mils. The stencil layers were adhered together and onto the polycarbonate base.

In operation, a sample plug of 1X PBS was injected at the inlet port 190. The fluid then passed into channel 198 located on the middle layer of the device and filled the channel until it reached junction overlap 203. At this point, the fluid front encountered two microfluidic impedances. In this example, the microfluidic impedance leading to channel 197 broke first. Eight devices were constructed and tested and all eight broke in the same order. Fluid filled channel 197 until sufficient pressure was applied at the exit port to break the microfluidic impedance leading to channel 199.

In this example, fluidic impedances 204 and 205 have identical size and geometry; however, because of the asymmetry of the tape layers, impedances 204 and 205 present different surface chemistries at the overlap region. The lower surface of channel 198 is coated with the water-based adhesive while the upper surface of channel 198 is uncoated polypropylene. This example shows how the differential pressure necessary to overcome an impedance is dependent on the nature of the surface chemistry at the impedance.

EXAMPLE 6

Figure 9:
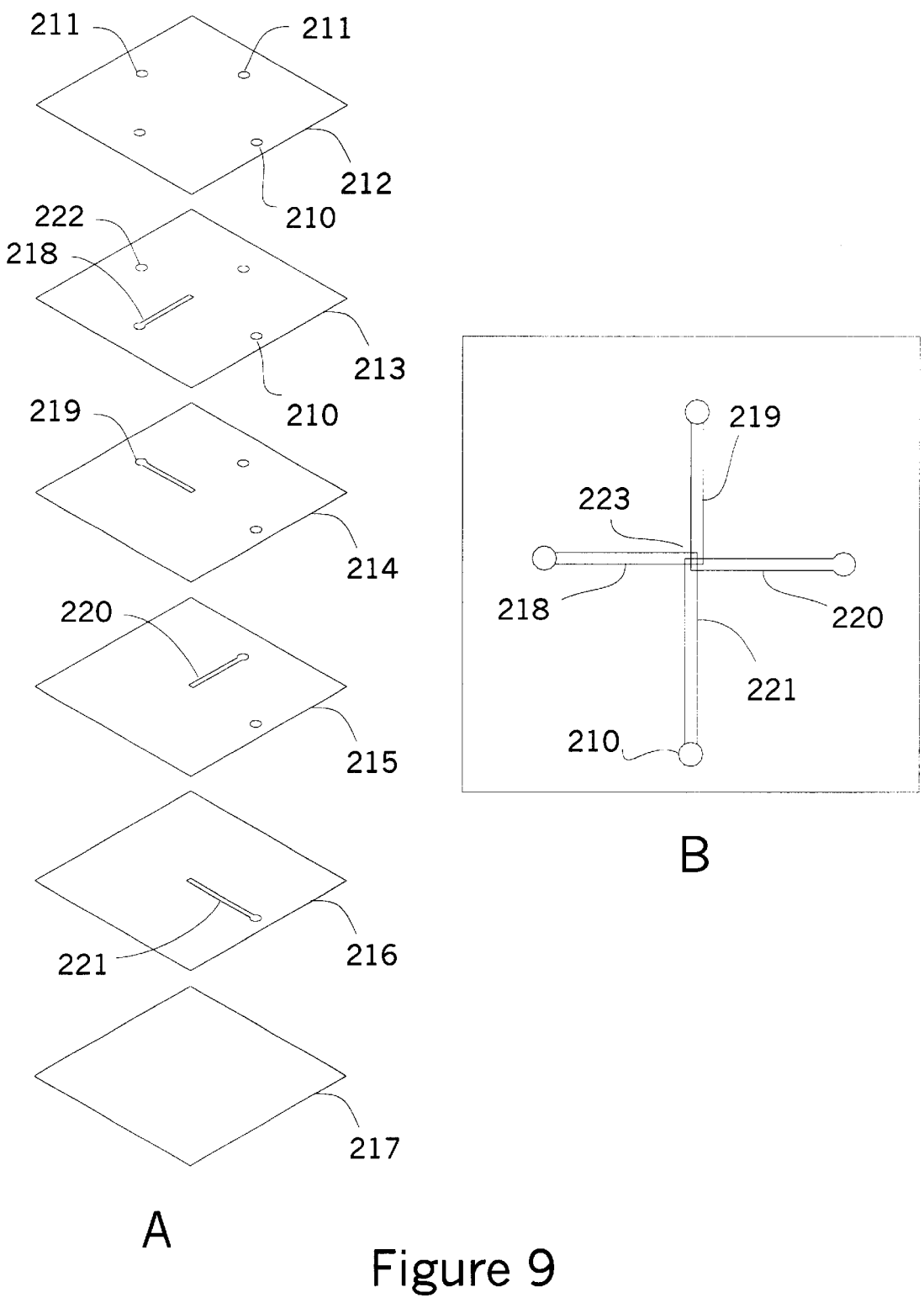
FIGS. 9A & B are a schematic of a microfluidic device with four channels in four layers that meet at a central overlap region to form an impedance.

In this example, a device is shown that contains four channels that meet at a central point that results in a multi-layered microfluidic impedance. Referring to FIG. 9A, an inlet port 210 and three outlet ports 211 were created in a ⅛" thick polycarbonate base 212. Five stencil layers were created 213–217 that have channels 218–221 and multiple apertures 222 cut into them. The stencils were constructed by cutting channels out of a piece of self-adhesive polypropylene tape with a permanent water-based adhesive having a total thickness of 3 mils. One of the stencil layers 217 had no channels or holes. The stencil layers were adhered together and onto the polycarbonate base.

The assembled device is shown in FIG. 9B and contains a fluidic overlap region 223 where all four of the channels come together at a single vertical position.

When aqueous buffer was injected into entry port 210, it passed through channel 221 until it reached the overlap region 223. The fluid then entered into channel 220 first, which is on the next adjacent stencil layer 215. The fluid then entered channel 219, and finally it entered channel 218.

The disclosures of all references cited herein are incorporated by reference in their entirety.

It is also to be appreciated that the foregoing description of the invention has been presented for purposes of illustration and explanation and is not intended to limit the invention to the precise manner of practice herein. It is to be appreciated therefore, that changes may be made by those skilled in the art without departing from the spirit of the invention and that the scope of the invention should be interpreted with respect to the following claims.

What is claimed is:

1. A microfluidic device comprising:
   a first layer having at least one first channel therein, wherein said first channel has at least one dimension smaller than 500 microns;
   a second layer having at least one second channel therein, wherein said second channel has a least one dimension smaller than 500 microns; and
   wherein said first and second channels are in fluid communication at an overlap region which hinders fluid flow between said first channel and said second channel.

2. The device of claim 1 wherein said first layer and said second layer are substantially planar.

3. The microfluidic device of claim 1 further comprising a lower support layer.

4. The microfluidic device of claim 1 further comprising a top layer.

5. The microfluidic device of claim 1 wherein said overlap region has an overlap area of less than about 4 square millimeters.

6. The microfluidic device of claim 5 wherein said overlap region has an overlap area of less than about 1 square millimeter.

7. The microfluidic device of claim 6 wherein said overlap region has an overlap area of less than about 0.5 square millimeters.

8. The microfluidic device of claim 1 wherein said first layer and said second layer are integral.

9. The microfluidic device of claim 1 wherein said first layer and said second layer are held together with pressure.

10. The microfluidic device of claim 1 wherein said first layer and said second layer are adhered with an adhesive.

11. The microfluidic device of claim 10 wherein said adhesive is selected from the group consisting of rubber-based adhesives, acrylic-based adhesives, silicone-based and gum-based adhesives.

12. The microfluidic device of claim 1 wherein at least one of said first layer and said second layer is self-adhesive.

13. The microfluidic device of claim 1 wherein at least one of said first layer and said second layer comprises an adhesive tape.

14. The microfluidic device of claim 13 wherein the adhesive tape has adhesive on one side.

15. The microfluidic device of claim 13 wherein the adhesive tape has adhesive on both sides.

16. The microfluidic device of claim 13 wherein the adhesive tape is selected from the group consisting of pressure-sensitive tapes, temperature-sensitive tapes, chemically activated tapes and optically-activated tapes.

17. The microfluidic device of claim 1 wherein said first layer and said second layer comprise materials selected from the group consisting of polymers, papers, fabrics and foils.

18. The microfluidic device of claim 1 wherein said first layer and said second layer comprise polymers selected from the group consisting of polyesters, polyimides, vinyls, acrylics, polycarbonates, polytetrafluorethylenes, polyurethanes, polyethylenes, polypropylenes, polyvinylidene fluorides, nylons, polyethersulfones, ABS, polyphenylene oxides, silicones, and derivatives thereof.

19. The microfluidic device of claim 1 wherein said first layer and said second layer are adjacent.

20. The microfluidic device of claim 1 further comprising an at least one spacer layer separating said first and said second layers, wherein said spacing layer has an aperture positioned such that said first and said second channels can communicate through said aperture.

21. The microfluidic device of claim 1 further comprising a third layer having a third channel therein wherein said third channel communicates with at least one of said first and said second channels.

22. The microfluidic device of claim 21 wherein said third channel is in communication with said first and second channels at said overlap region.

23. The microfluidic device of claim 1 further comprising an outlet port in communication with one of said first and second channels.

24. The microfluidic device of claim 23 further wherein said outlet port has a semi-permeable membrane that selectively allows a gas to pass through said membrane while substantially hindering passage of a liquid.

25. The microfluidic device of claim 24 further comprising a third layer wherein said semi-permeable membrane forms all or part of said third layer.

26. The microfluidic device of claim 24 wherein said semi-permeable membrane is a polymeric material.

27. The microfluidic device of claim 25 wherein said polymeric material has pores in the range of between about 0.1 microns and about 100 microns.

28. The microfluidic device of claim 1 wherein said first and second channels have top, bottom and side surfaces.

29. The microfluidic device of claim 28 wherein any one of said surfaces is chemically treated.

30. The microfluidic device of claim 29 wherein said chemical treatment is selected from the group consisting of plasma cleaning and chemical etching.

31. The microfluidic device of claim 29 wherein said surface is chemically derivatized with a biomolecule selected from the group consisting of nucleic acids, proteins and carbohydrates.

32. The microfluidic device of claim 1, further comprising a filter material in fluid communication with the first channel or second channel.

33. A microfluidic device comprising:
   a plurality of layers defining a first, a second, and a third channel, wherein each channel has at least one dimension smaller than 500 microns and at least two of the channels are defined in different layers;
   wherein the first channel is in fluid communication with the second channel at a first overlap region that hinders flow between the first channel and the second channel; and
   wherein the first channel is in fluid communication with the third channel at a second overlap region that hinders flow between the first channel and the third channel.

34. The microfluidic device of claims 33 wherein fluid introduced into the first channel overcomes the hindrance of the first overlap region and the hindrance of the second overlap region in a predictable sequence.

35. The microfluidic device of claim 33 wherein fluid introduced into the first channel overcomes the hindrance of the first overlap region at a first pressure to permit fluid to enter the second channel, and fluid introduced into the first channel overcomes the hindrance of the second overlap region at a second pressure to permit fluid to enter the third channel.

36. The microfluidic device of claim 35 wherein the second pressure is substantially greater than the first pressure.

37. The microfluidic device of claim 36 wherein the second pressure is at least about double the first pressure.

38. The microfluidic device of claim 33 wherein at least two of the first, second, and third layer are adjacent layers.

39. The microfluidic device of claim 33 wherein the layers are adhesively bonded.

40. The microfluidic device of claim 33 wherein at least one of the channels is defined in a stencil layer.

41. The microfluidic device of claim 33 wherein the first, second, and third layer comprise materials selected from the group consisting of polymers, papers, fabrics and foils.

* * * * *

UNITED STATES PATENT AND TRADEMARK OFFICE
CERTIFICATE OF CORRECTION

PATENT NO. : 6,561,208 B1
DATED : May 13, 2003
INVENTOR(S) : O'Connor et al.

It is certified that error appears in the above-identified patent and that said Letters Patent is hereby corrected as shown below:

Column 6,
Line 47, the phrase "should be sufficiently different go" should read -- should be sufficiently different so --

Column 16,
Line 61, the phrase "device of claim 23 further wherein" should read -- device of claim 23 wherein --

Signed and Sealed this

Seventh Day of September, 2004

JON W. DUDAS
*Director of the United States Patent and Trademark Office*